United States Patent [19]
Klein et al.

[11] Patent Number: 5,472,264
[45] Date of Patent: Dec. 5, 1995

[54] BRAKE UNIT FOR AUTOMOTIVE VEHICLES WITH ELECTRIC DRIVE

[75] Inventors: Hans-Christof Klein, Hattersheim; Peter Drott, Frankfurt am Main; Peter Lohberg, Friedrichsdorf; Juergen Balz, Wiesbaden, all of Germany

[73] Assignee: ITT Automotive Europe GmbH, Germany

[21] Appl. No.: 182,014

[22] PCT Filed: Jul. 23, 1992

[86] PCT No.: PCT/EP92/01681

§ 371 Date: Jan. 24, 1994

§ 102(e) Date: Jan. 24, 1994

[87] PCT Pub. No.: WO93/01959

PCT Pub. Date: Feb. 4, 1993

[30] Foreign Application Priority Data

Jul. 24, 1991 [DE] Germany .................. 41 24 496.6

[51] Int. Cl.⁶ ................ B60T 11/10; B60T 8/18
[52] U.S. Cl. ................ 303/3; 303/15; 303/20; 303/22.1; 188/181 C; 188/182
[58] Field of Search .............. 303/3, 9.71, 15, 303/20, 113.4, 16, 22.1; 188/156, 181 A, 181 C, 182; 318/87, 371

[56] References Cited

U.S. PATENT DOCUMENTS

| | | | |
|---|---|---|---|
| 3,621,929 | 11/1971 | Oberthur et al. | 303/3 X |
| 4,181,366 | 1/1980 | Dobner | 303/3 |
| 4,270,806 | 6/1981 | Venkaperumal et al. | 303/3 |
| 4,425,005 | 1/1984 | Warwick | 303/3 |
| 4,671,577 | 6/1987 | Woods | 303/3 |
| 4,861,115 | 8/1989 | Petersen | 303/22.1 X |
| 5,002,343 | 3/1991 | Brearley et al. | 303/22.1 X |

FOREIGN PATENT DOCUMENTS

| | | |
|---|---|---|
| 0083557 | 7/1983 | European Pat. Off. . |
| 0361708 | 4/1990 | European Pat. Off. . |
| 0418995 | 3/1991 | European Pat. Off. . |
| 2545542 | 4/1976 | Germany . |
| 3806786 | 9/1988 | Germany . |

*Primary Examiner*—Robert J. Oberleitner
*Assistant Examiner*—Peter M. Poon
*Attorney, Agent, or Firm*—Ratner & Prestia

[57] ABSTRACT

A brake unit for automotive vehicles with electric drive is configured in the shape of a multiple-circuit compound system consisting of hydraulic friction brakes of brake circuits (I, I', I", III, III', III") and of an electroregenerative brake system (circuit II, II', II"). In a vehicle with a driven and a non-driven axle, three brake circuits exist, one brake circuit of which (I, I', I") is comprised of a pedal-actuated hydraulic brake pressure master unit (2) and of friction brakes (3, 4) acting upon the non-driven wheels. The second brake circuit (II, II', II") which represents an electroregenerative brake system is directly or indirectly coupled to the brake pedal and acts upon the driven wheels. The third brake circuit (III, III', III") which is comprised of friction brakes (10, 11) also acts upon the driven wheels. The actuation of the wheel brakes (10, 11) is connected to the second and third brake circuits. The distribution of the brake power to the front axle (VA) and to the rear axle (HA) is controlled with the aid of an electronic controller (7, 7',7").

23 Claims, 7 Drawing Sheets

BRAKE UNIT FOR AUTOMOTIVE VEHICLES WITH ELECTRIC DRIVE

FIELD OF THE INVENTION

The invention is related to a brake unit for automotive vehicles with electric drive and with a driven and a non-driven axle. The brake unit is configured in the shape of a multiple-circuit compound system consisting of hydraulic friction brakes and of an electroregenerative brake system. The electroregenerative brake system utilizes the electric driving motor or at least one of the electric driving motors of the automotive vehicle for braking and for energy recovery. Three brake circuits are provided. The first brake circuit is comprised of a pedal-actuated brake pressure master unit and of friction brakes acting upon the non-driven wheels. The second brake circuit is constituted by the electroregenerative brake system which is directly or indirectly coupled to the brake pedal and which acts upon the driven wheels. The third brake circuit is comprised of friction brakes which also act upon the driven wheels and are coupled to the brake pedal.

BACKGROUND OF THE INVENTION

A brake unit of this kind is known, for example, from German patent application No. 2,545,542 published without examination. In the prior-art brake unit, the brakes associated with the driven wheels are preceded by a combination of two valves arranged in parallel and consisting of an electromagnetically actuatable valve and of a pressure-actuated valve. Only two switching conditions can be realized by this valve combination. In one switching condition, the brakes acting upon the driven wheels are connected to the brake pressure master unit in an unobstacled way. In the other, the hydraulic pressure existing in these brakes is limited in the event of a regenerative braking action, respectively of an emergency stop.

The fact that there is no possibility of recognizing the behavior of the electric driving motor and adapting the hydraulic portion of the brake power in an optimum manner to its characteristic is a disadvantage in the state-of-the-art brake unit.

SUMMARY OF THE INVENTION

It is, therefore, an object of the present invention to configure the brake unit of the present invention in such a way that during a braking action the hydraulic portion of the brake power is continuously adapted in accordance with the behavior of the driving motor in order to achieve an optimum energy recovery.

According to the invention, this object is attained in that the actuation of the friction brakes which are connected to the second or to the third brake circuit and the distribution of the brake power to the front axle and to the rear axle are controllable with the aid of an electronic controller. The electronic controller is fed with information on the position of the brake pedal and/or on the brake pressure caused by the actuation of the pedal or on the brake torque, on the position of the accelerator pedal, on the vehicle speed, and on the charging condition of the vehicle batteries or at least with some of these types of information. The electronic controller evaluates this information for the control of the brakes acting on the driven wheels. The aim achieved by these provisions is that the friction brakes which are associated with the driven wheels are not involved in the most frequent braking actions, since on account of its torque characteristic

2 the driving motor alone furnishes the required brake power. In addition, it will be possible to realize different characteristic curves of brake power distribution in accordance with the demands for an ideal distribution of the brake power and for a maximum energy recovery.

Furthermore, it will be advantageous in some applications when in addition to the electroregenerative brake system and to the friction brakes acting upon the driven wheels, the brake unit is equipped with an electrohydraulic or with an electromechanical drive, and with an actuating mechanism. On the other hand, also a hydraulic system may be envisaged in which through electrically actuatable hydraulic valves an auxiliary pressure source, and a pressure balancing tank, is connectible. In this context, the auxiliary pressure source will expediently be comprised of a hydraulic pump driven by an electric motor and of a pressure accumulator. The brake pressure control takes place exclusively by an electric actuation of the hydraulic valves through which practically any desired brake pressure can be adjusted in the wheel brakes. The required actuating impulses are calculated in the electronic controller.

According to another design version, the electronic controller of the inventive brake unit varies the brake power distribution depending on the loading of the vehicle and/or the distribution of the dynamic axle load or on the driving situation, for example on an emergency braking situation.

A further important design version of the invention consists in that the first and the third hydraulic brake circuits are extended to form an anti-lock control system and/or a traction slip control system by inserting hydraulic valves which are controllable depending on the rotational behavior of the individual wheels. Expediently, the electroregenerative brake system will be switched off for the duration of the control action.

In order to be able to brake each driven wheel with another nominal brake pressure value depending on the specific situation, a further important design variant of the invention consists in that the third brake circuit is subdivided in such a way that an actuation of the friction brakes acting upon the driven wheels is possible independently of each other.

In this way, it is particularly advantageous to connect the wheel brakes acting upon the driven wheels, through electrically actuatable hydraulic valves, on one hand, to hydraulic accumulators and, on the other hand, to an auxiliary pressure source and to a pressure balancing tank. A further hydraulic accumulator is simultaneously connected to the auxiliary pressure source and is connected, through further electrically actuatable hydraulic valves, both to the friction brakes which act upon the non-driven wheels and to the friction brakes which act upon the driven wheels.

According to another embodiment, through a totalizing stage which may be mechanical, the pedal force and actuating power act upon the brake pressure master unit. The actuating power may be generated with the aid of an actuator which may be electrical. In the case of an anti-lock control, an electrically actuated pedal travel limiter may be provided for the limitation of the pedal force. Brake units with mechanical totalizing stages and with actuators of this kind are known from German patent application No. 3,806,786 A1, published without examination (1st publication). In this manner, controlled brake units can be realized with relatively slight design efforts and at relatively low cost.

BRIEF DESCRIPTION OF THE DRAWINGS

Further features, advantages and possibilities of application of the invention will be revealed by the description below making reference to the accompanying drawings of embodiments of the invention.

In the drawings.

DETAILED DESCRIPTION OF THE INVENTION

Figure 1:
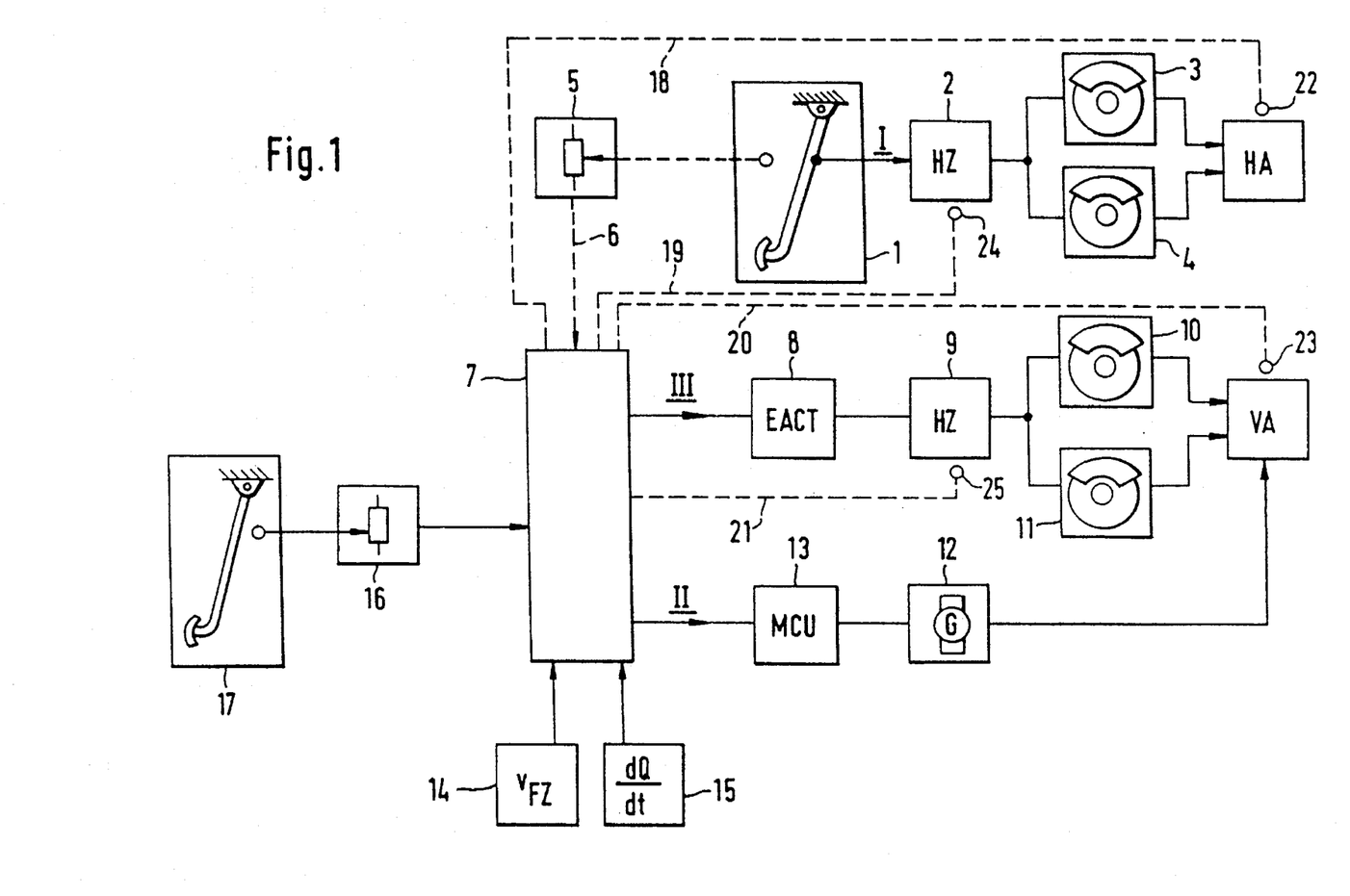
FIG. 1 shows the most important components of a brake unit according to the invention in a schematic, simplified type of representation.

The brake unit according to FIG. 1 is intended for a vehicle with front-wheel drive. In this design version of the invention, the inventive brake unit has three brake circuits I, II, III which are independent of one another. The brake circuit which acts upon the non-driven wheels, i.e. the rear wheels (rear axle HA), is comprised of a master cylinder 2 which is actuated by a brake pedal 1 and to which the wheel brakes 3 and 4 of the rear axle HA are directly connected. Brake circuit I constitutes a conventional, hydraulically actuated friction brake circuit.

The other two brake circuits II and III, which form a compound system jointly with the brake circuit I, are actuated with the aid of brake pedal 1. For this purpose, the brake pedal 1 is equipped with a pedal position transmitter 5 which feeds electric signals which depend on the pedal travel or on the pedal position over a signalling line 6 to an electronic controller 7. The two brake circuits II, III are connected to controller 7 and both act upon the wheels of the front axle VA.

The brake circuit III comprises an electrically controllable actuator 8 and a master cylinder 9 to which, similarly as in the brake circuit I, hydraulically actuatable wheel brakes 10, 11, namely disc brakes or drum brakes, are connected. The actuator 8 may, for example, be configured as an electric motor with a worm drive. Such a configuration allows for a force to be transmitted either directly or through a hydraulic pressure fluid connection to the piston in the master cylinder 9. This force causes the piston to slide axially in the conventional manner depending on the actuating signals.

In contrast with the brake circuits I, III, the the brake circuit II is configured as a component part of an electroregenerative brake system. Through this brake circuit II, energy is recovered at each braking action. This brake circuit II is substantially formed by the automotive vehicle driving motor 12 with the associated electronic actuating unit 13 which is activated in its turn by the electronic controller 7 depending on various types of information and is in communication with the other two brake circuits I, III.

The controller 7 controls the contribution of the brake circuits II and III depending on numerous types of information. In addition to the electric signals which reproduce the position of the brake pedal 1 and which are fed in through the transmitter 5 and the line 6, the electronic controller 7 is also fed the required information on the vehicle speed $v_{FZ}$ through a switching loop 14, on the make-up charging capacity of the battery through a switching loop 15 and on the accelerator pedal 17 position through an accelerator pedal position transmitter 16. From these input parameters which will still be supplemented with further measured values or data depending on the specific version of the brake unit, the electronic controller 7 calculates the control parameters for the electronic actuating unit 13 of the vehicle driving motor 12 and calculates the contribution which has to be covered by the friction brakes 10, 11 for achieving a sufficient deceleration. Vehicle driving motor 12 can be switched to a generator for the recovery of energy.

The brake unit of the present invention utilizes the braking effect of the electric driving motor for the reproduction of the effect of the yawing torque one is accustomed to from conventional automotive vehicles. When the driver resets the accelerator pedal 17, then a certain deceleration of the vehicle will come about due to the yawing torque. For this purpose, accelerator pedal 17 is equipped with the position transmitter 16 whose signals are evaluated in the electronic controller 7. From the position of the accelerator pedal 17 and from the pedal resetting rate in conjunction with the information on the vehicle speed $v_{FZ}$ and on the make-up charging capacity of the battery (switching loop 15), the controller 7 can calculate the necessary control parameters for the control of the driving motor 12 in order to simulate a tender effect of the yawing torque.

The hydraulic brake circuit I which is actuated directly by the brake pedal 1 will expediently be dimensioned in such a way that the total brake pedal travel, which is customarily provided for the actuation of a hydraulic dual-circuit brake unit with a tandem master cylinder, will in this instance now exclusively actuate the brake circuit I of the rear axle, even in the presence of an identical or slightly increased pedal ratio. Thus, the demanded auxiliary braking function can be attained with relatively low pedal effort. In addition, the accustomed pedal feeling will be preserved.

The maximum brake power portion which is achievable with the aid of the brake circuit II depends, among others, on the vehicle speed $v_{FZ}$. The brake power portion of the electric motor 12 increases more than proportionally as the vehicle speed decreases. This brake has, thus, the tendency to increase its effect by itself. Since only a limited portion of the demanded front axle braking effect can be covered through the electroregenerative brake circuit II, especially at more elevated driving speeds, the brake circuit III is required. It must also be taken into account that the braking contribution of the brake circuit II also depends on the charging condition of the battery. The make-up charging capacity of the battery which is monitored by the switching loop 15 is taken into account for the control action. Since the vehicle speed decreases by the braking action, the distribution of the brake power is according to the invention permanently being varied and being adapted to the existing circumstances by the controller.

In FIG. 1, a number of other signalling lines 18 to 21 are shown in dashed lines through which the electronic controller 7 is fed information on the brake torque at the rear axle (signalling line 18), on the brake torque at the front axle (signalling line 20) and on the pressure in the master cylinder 2 (signalling line 19) as well as in the master cylinder 9 (signalling line 21). This information can be evaluated either in addition to or instead of the information acquired with the aid of the brake pedal position transmitter 5 for the purpose of generating the output signals of the controller 7. The signalling lines 19 and 21 are respectively connected to associated pressure sensors 24, 25, while the signalling lines 18 and 20 respectively conduct the output signals of brake torque sensors 22, 23 to the controller 7.

Figure 2:
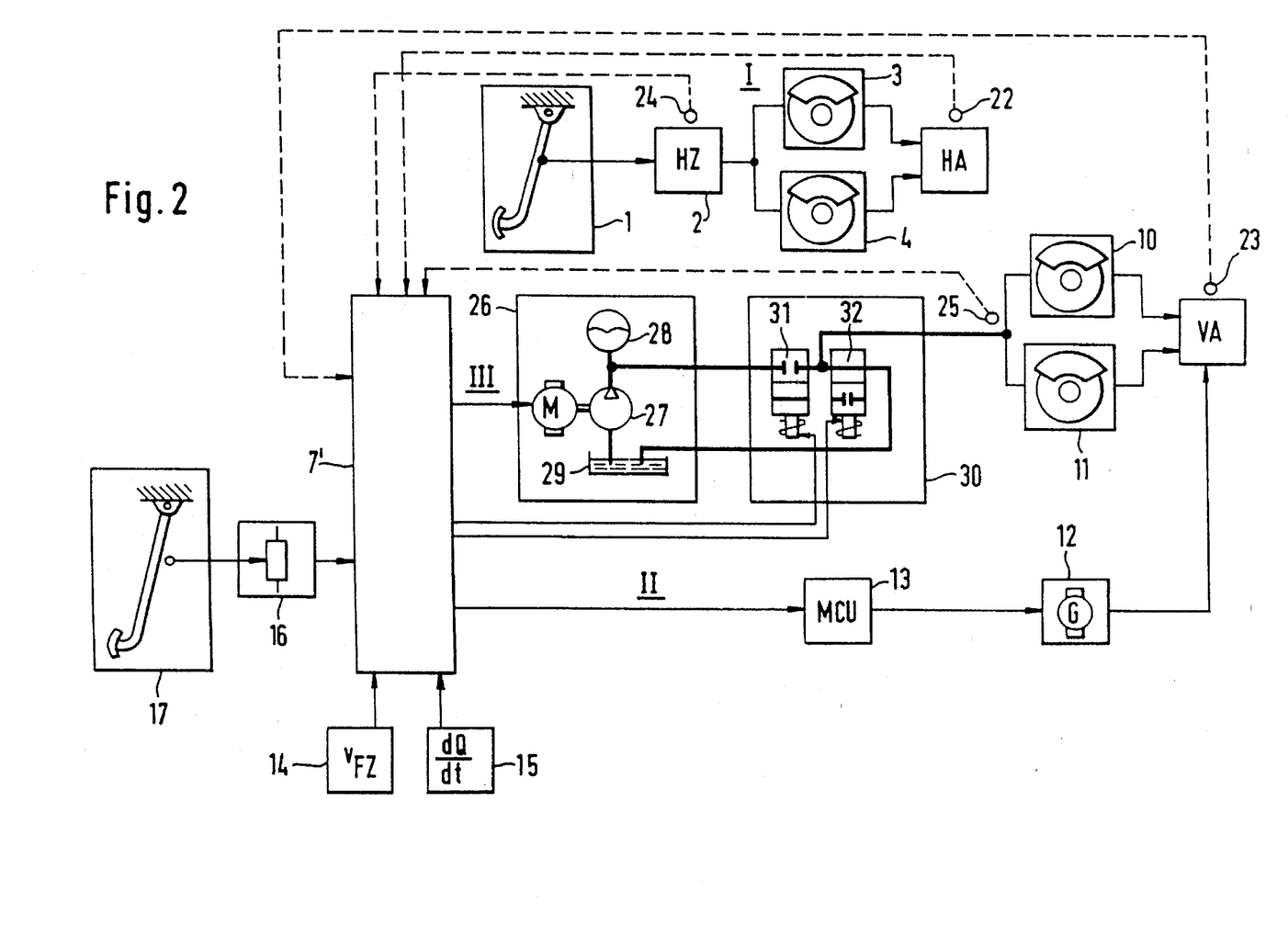
FIG. 2 shows a further design version of the invention in an identical type of representation.

The brake unit according to FIG. 2 is distinguished from the unit according to FIG. 1 by the configuration of the brake circuit III which acts upon the driven wheels, i.e. on the wheels of the front axle VA in this case. While in the embodiment according to FIG. 1 the brake pressure is generated with the aid of an actuator 8, an auxiliary pressure source 26 is used in the embodiment according to FIG. 2. Auxiliary pressure source 26 is substantially composed of a hydraulic pump 27 driven by an electric motor and of a hydraulic accumulator 28. The suction side of the pump ends up in a pressure balancing tank 29 into which hydraulic pressure fluid is fed in the event phase of pressure decrease. A pressure modulator 30 is provided for the control of the pressure in the wheel brakes 10, 11 at the wheels of the front axle VA. The pressure modulator 30 includes, in this instance, two electrically actuatable hydraulic valves, namely 2/2-way valves 31 and 32. Through these valves, either a connection is established going from the auxiliary pressure source 26 to the wheel brakes 10, 11 of the front wheels or going from these wheel brakes to the pressure balancing tank 29. The pressure can be raised to the desired level and be decreased again by dimensioning the switching-in times of the valves.

The valves 31, 32 of the pressure modulator 30 are controlled by the electronic controller 7' which is fed for the purpose, as in the embodiment according to FIG. 1, the necessary information with the aid of a brake pedal position transmitter (not shown in the drawing) or with the aid of the brake pressure sensors 24, 25. In addition to that, the controller 7' is supplied information on the position of the accelerator pedal 17, on the vehicle speed $v_{FZ}$ and on the make-up charging capacity of the battery (switching loop 15). The electroregenerative brake system of the compound system is again configured in the shape of the brake circuit II.

Figure 3:
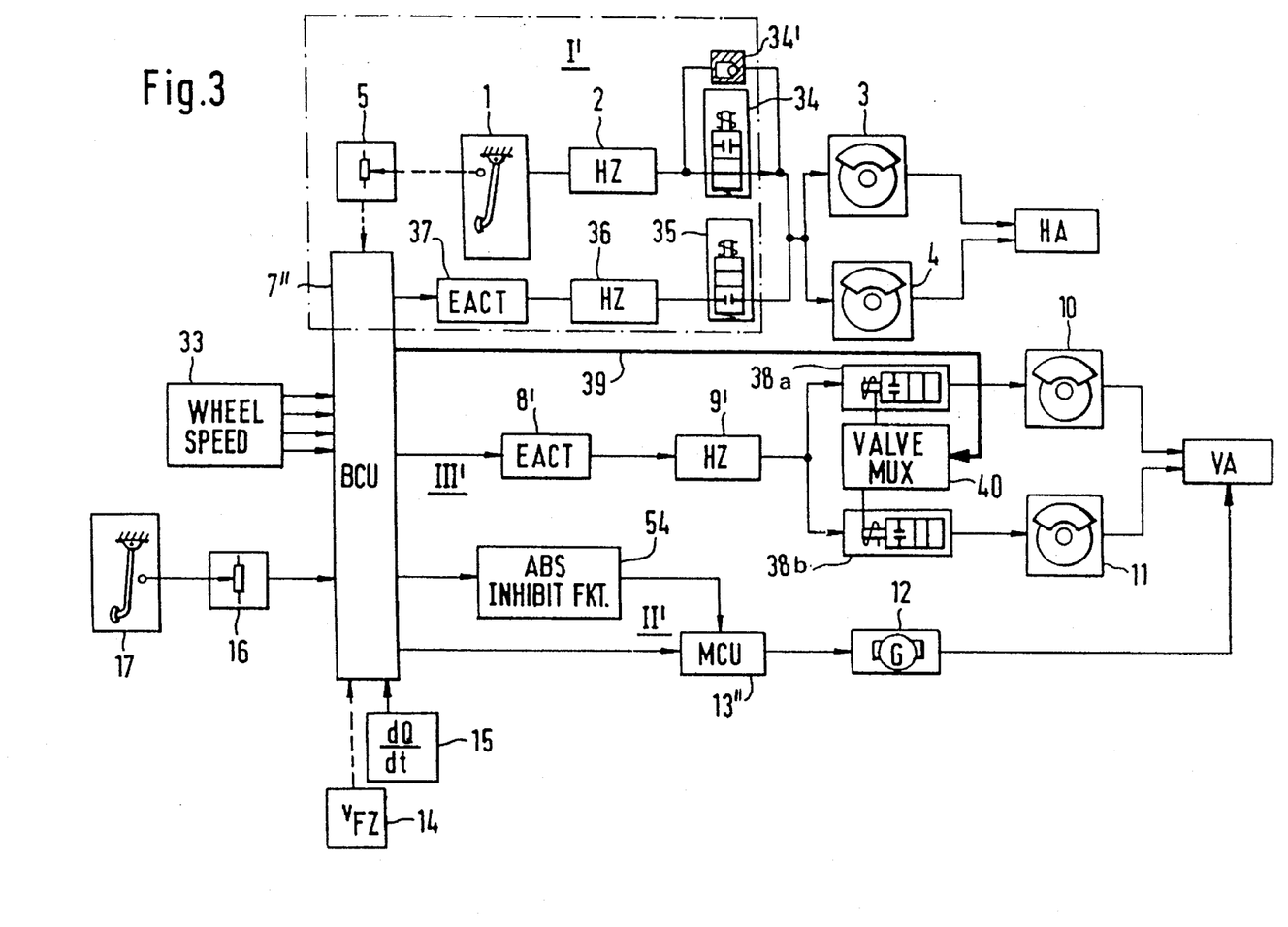
FIG. 3 shows a brake unit with anti-lock control in an identical type of representation.

FIG. 3 shows an extension of the inventive brake unit to a compound brake system with anti-lock control and/or traction slip control. In order to achieve this, the electronic controller 7" is additionally fed information on the rotational behavior of the individual vehicle wheels. The associated wheel sensors are symbolized by a switching loop 33 which is comprised of sensors for each individual wheel with each sensor having one signalling line leading to the controller 7".

Furthermore, a hydraulic valve 34 which is open in the normal position and is electrically actuatable to a closed position is inserted in the hydraulic brake circuit I' which leads to the brakes 3, 4 of the non-driven wheels, i.e. to the rear wheels. During a control operation, the master cylinder 2 of the brake circuit I' is cut off by this valve 34 and a further master cylinder 36 is connected instead to the wheel brakes 3, 4 of the rear wheels through a further hydraulic valve 35 which is locked in the normal position. The pressure within the additional master cylinder 36 is generated and modulated with the aid of an electrically controllable actuator 37 which is controlled by the electronic controller 7". A non-return valve 34' which opens in the direction of the master cylinder 2 is arranged parallel to valve 34. This non-return valve 34' safeguards the pressure decrease in the event of the release of the brake.

In the event of an anti-lock control and/or of a traction slip control action, the electroregenerative brake circuit II' is prevented from functioning with the aid of a locking switching loop 54. The output signal of locking switching loop 54 actuates for this purpose the driving motor actuating loop 13".

In the third brake circuit III' which also acts upon the driven wheels, i.e. on the wheel brakes 10, 11 of the front wheels, an electric actuator 8' and a master cylinder 9' are again inserted, as in the embodiment according to FIG. 1. In the hydraulic pressure fluid path going from the master cylinder 9' to the friction brakes 10, 11 at the front wheels, there are further electrically controllable hydraulic valves 38a, 38b by means of which the brake pressure in the wheel brakes of the front wheels is controlled in a known manner.

In the embodiment according to FIG. 3, hydraulic valves 38a, 38b are actuated through a multiplex switching loop 40 which is connected to the electronic controller 7" by way of a signalling output line 39.

With such a valve arrangement and multiplex actuation or with other state-of-the-art valve arrangements, the brake pressure in the connected brakes can very precisely be adjusted to the value or pressure course which is favorable for an anti-lock control or a traction slip control system.

Figure 4:
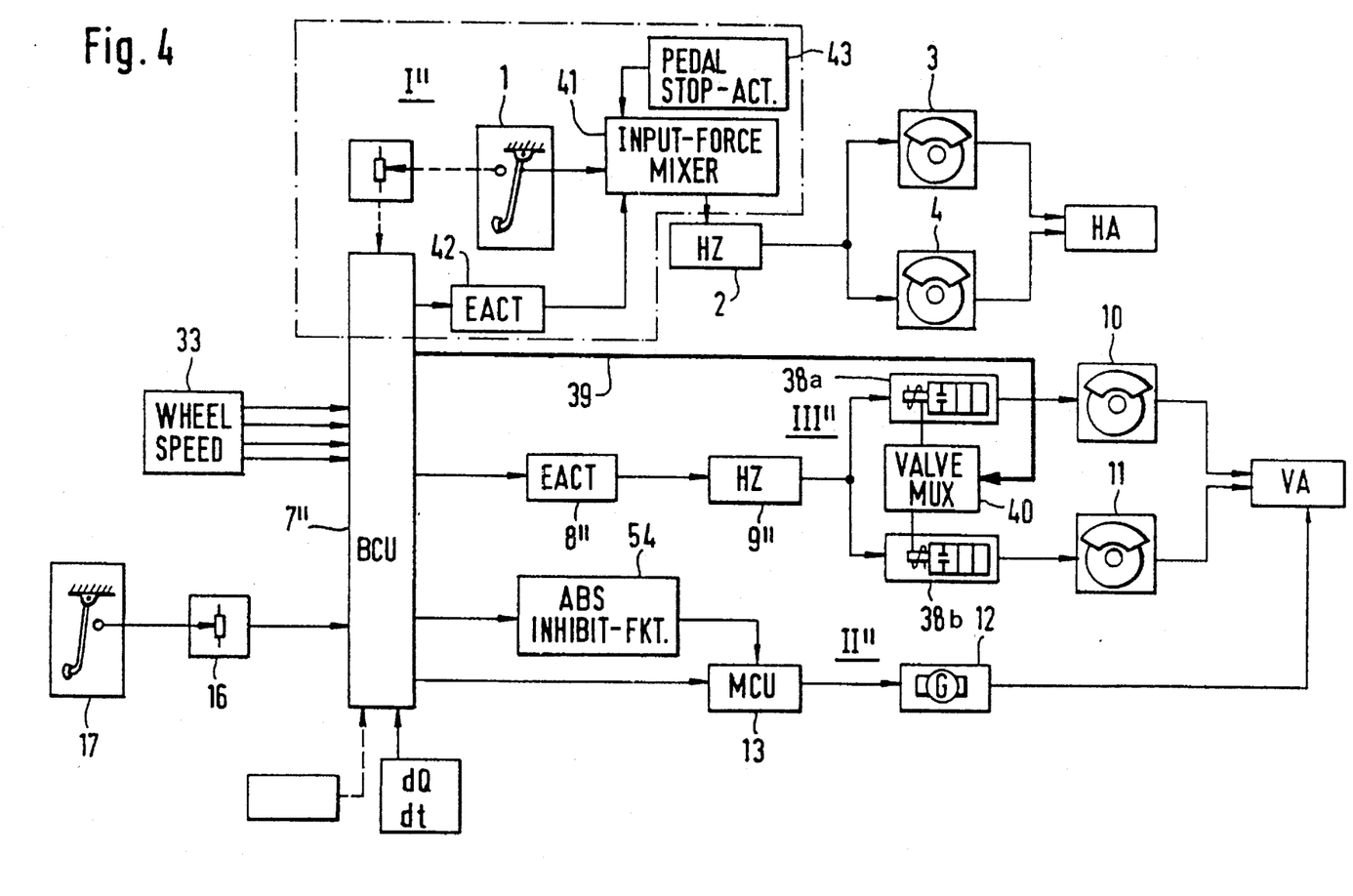
FIG. 4 shows a second embodiment of a brake unit with anti-lock control in an identical type of representation.

The design version of the inventive brake unit according to FIG. 4 differs from the embodiment shown in FIG. 3 by a so-called mechanical totalizing stage as a component part of the brake circuit I". Jointly with an electric actuator 42 and with a pedal travel limiter 43, the totalizing stage 41 serves as the anti-lock control and the traction slip control. The totalizing stage 41 precedes the master cylinder 2 which brings about the desired brake pressure in the connected friction brakes 3, 4 at the non-driven wheels of the rear axle HA. The other two brake circuits II", III" of the brake unit according to FIG. 4 are identical to the analogous brake circuits according to FIG. 3.

Figure 5:
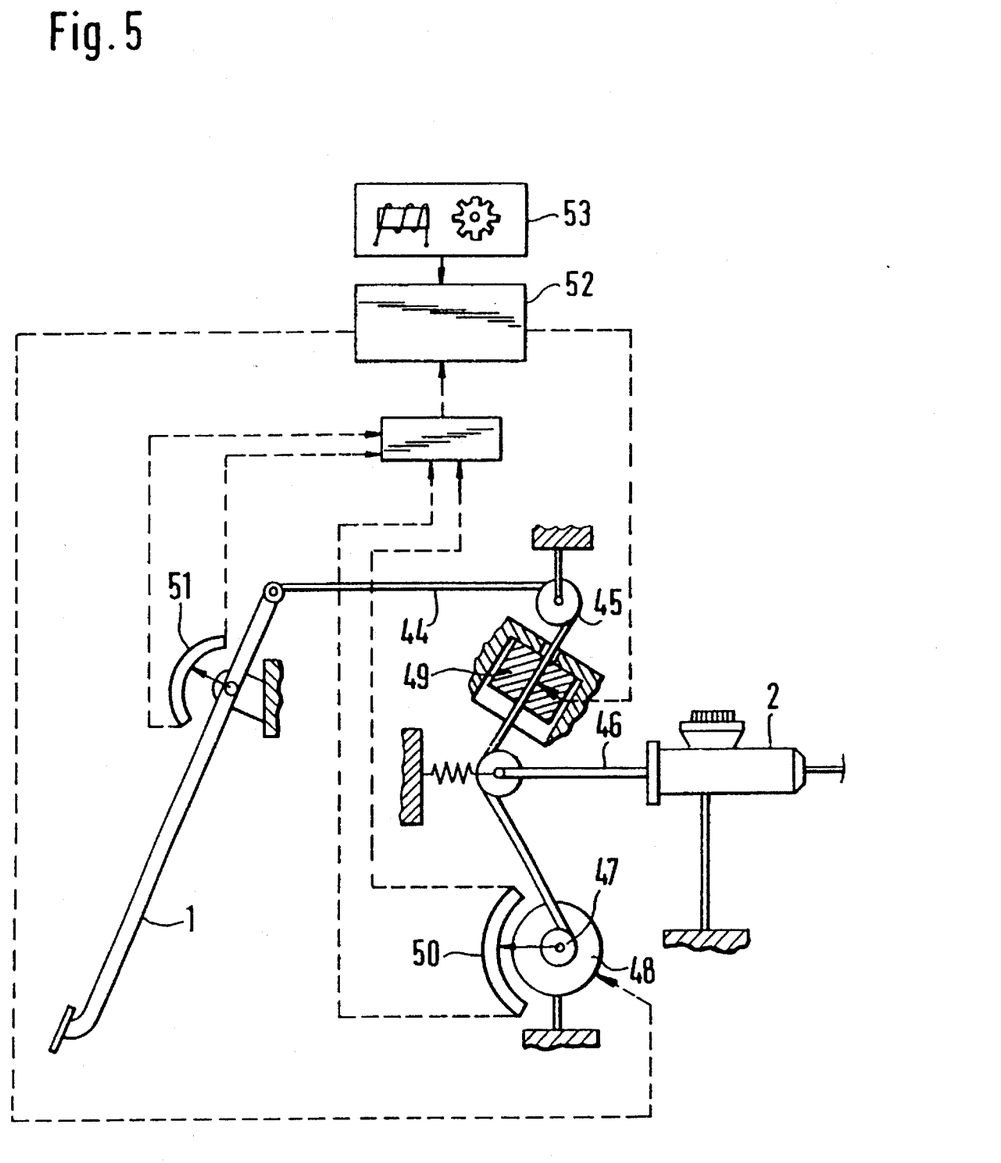
FIG. 5 shows the constructional configuration of a totalizing stage of the brake unit in FIG. 4 in a diagrammatic representation.

FIG. 5 shows a constructional embodiment of the totalizing stage, of the actuator and of the pedal travel limiter according to FIG. 4. Through a traction cable 44 and through a stationary guide, pulley 45, an actuating force is exerted in this case on a push rod 46 of the master cylinder 2 by means of the brake pedal 1. The traction cable 44 runs up to a winding pulley 47 which can be rotated by an electrically driven and controllable winding motor 48. In addition, the traction cable 44 runs through an electrically controllable, cable clamp 49 which performs the function of the pedal travel limiter 43 according to FIG. 4. As soon as it has clamped the traction cable 44, the cable clamp 49 prevents a further increase of the force which is exerted by the pedal 1 on the master cylinder 2. A U-shaped stop for the cable clamp 49 is marked out by shading in FIG. 5. The winding motor 48 alone will then move the push rod 46 of the master cylinder and will carry out the pressure modulation. A potentiometer 50, which is coupled to the axle of the motor 48, and a pedal travel transmitter 51, which is comparable to the pedal travel transmitter 5 in FIG. 4, furnish the required information for the control of the winding procedure and, thus, of the brake pressure.

The control signals are generated with the aid of a switching loop 52 which evaluates the signals furnished by potentiometer 50 and by pedal travel transmitter 51, which links them to the signals of the symbolically represented wheel sensors 53 and which generates the actuating signals for the winding motor 48 and for the cable clamp 49.

Figure 6:
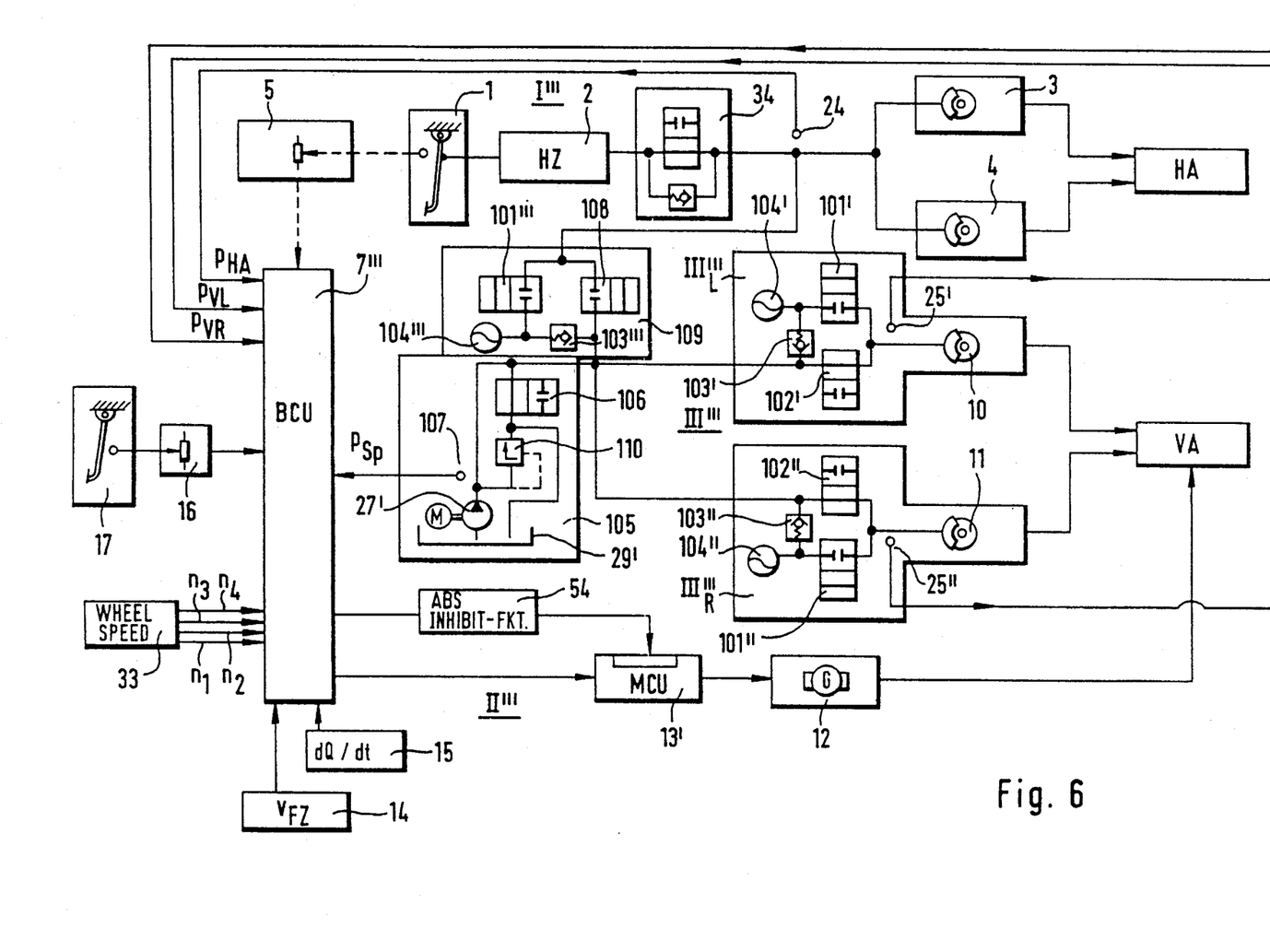
FIG. 6 shows a third embodiment of a brake unit with anti-lock control in a type of representation corresponding to that in FIG. 1 to FIG. 4.

In the embodiment of the inventive brake unit which is shown in FIG. 6, the third brake circuit III''' is subdivided into two hydraulic partial brake circuits $III_L'''$, $III_R'''$ which are structured identically. The partial brake circuits $III_L'''$, $III_R'''$ are each composed of two electrically actuatable hydraulic valves 101', 101", 102', 102" which are arranged preceding the friction brakes 10, 11 and of a hydraulic accumulator 104', 104", which is linked to the inlet connection of the valves 101', 101". Valves 101' 101" are closed when de-energized. The hydraulic valves 101', 101", 102', 102" are simultaneously in connection, through hydraulic lines not being identified more specifically, with a hydraulic auxiliary pressure source 105. Interposed between the auxiliary pressure source 105 and valves 101', 101" are two non-return valves 103', 103" respectively Each one of the two friction brakes 10, 11 is associated with a pressure sensor 25', 25" whose function has been explained in the description of the preceding embodiments. Similarly as in the design version according to FIG. 2, the auxiliary pressure source 105 is constituted by a motor-and-pump assembly 27' to whose outlet both the line supplying the hydraulic partial brake circuits $III_L'''$, $III_R'''$ with hydraulic pressure fluid and a valve arrangement are connected. The valve arrangement includes an electrically actuatable 2/2-way valve 106, open when de-energized, and a pressure limiting valve 110, connected in series with valve 106. The valve arrangement affords a connection with a pressureless balancing tank 29'. In addition, a measuring device 107 for monitoring the maximum hydraulic pressure reached is provided which may, for example, be constituted by a pressure-controlled switch.

To the hydraulic outlet of the auxiliary pressure source 105, a further hydraulic circuit 109 is connected which consists of a third hydraulic accumulator 104''', of two electrically actuatable 2/2-way valves 101''', 108, preferably closed when de-energized (SG), and of a third non-return valve 103'''. The third hydraulic accumulator 104''' is in connection, on one side, with the third non-return valve 103''' which closes in the direction of the motor-and-pump assembly 27', with the hydraulic auxiliary pressure source 105 and is connected, on the other side, with the 2/2-way valve 101''', closed when de-energized (SG), leading to the friction brakes 3, 4 which are associated with the non-driven wheels. The pressure of friction brakes can be decreased in the event of a control action by the switching-over of the 2/2-way valve 108, closed when de-energized (SG), (through the open 2/2-way valve 106). The latter elements 104''', 103''', 101''' and 108 can be accommodated within a valve block which may, advantageously, be combined with the auxiliary pressure source 105 to form one constructional unit.

When the accumulated pressure of one of the hydraulic accumulators 104', 104", 104''' has decreased below an admissible value, then the relevant accumulator will be recharged by the auxiliary pressure source 105. The valves 102', 102", 106 will be energized for this purpose, so that a separation of the friction brakes 10, 11 which are associated with the driven wheels from the auxiliary pressure source will come about. After the charging procedure and the de-energization of the valves 102', 102", 106, the lines which lead to the front wheel brakes 10, 11 will become pressureless.

The aim achieved by this circuitry is that the line leading from the auxiliary pressure source 105 to the front wheel brakes 10, 11 is utilized both for the charging of the accumulators 104', 104", 104''' and for the decrease of the pressure which acts in the front wheel brakes 10, 11. The non-return valves 103', 103", 103''' prevent a back-emptying of the hydraulic accumulators 104', 104", and 104'''.

The function of the brake circuits I and II is identical to the one described before and need, therefore, not be dealt with again. When in the brake unit according to FIG. 6 a braking operation is initiated, the brake power furnished by the front wheel brakes 10, 11 is increased by the energization of the hydraulic valves 101', 102', 101" and 102" and decreased again by de-energization. Maintaining the pressure constant can be realized by de-energizing the hydraulic valves 101', 101" and energizing the hydraulic valves 102', 102". The electric connections going from the controller 7 to the aforementioned valves are not shown in the drawing for the sake of clarity. Depending on the pressure required at the front wheels 10, 11, the controller 7 will generate by itself a nominal-value range and will control the hydraulic valves 101', 101", 102', 102" until the value measured by the pressure sensors 25', 25" falls within this nominal-value range. Due to the subdivision of the third brake circuit III''' into two separate front-wheel partial brake circuits $III_L''$ and $III_R'''$, there is the possibility to brake each driven wheel with individual nominal values as the specific situation may be and to realize, for example, functions which are connected with an electronic differential pawl.

In the event of a braking operation with anti-lock control action as already described above, the regenerative second brake circuit II''' will be deactivated. For the application of a standard anti-lock control system, the wheel speed signals will be evaluated in the circuit 33 which is intended for this purpose. The pressure modulation at the front wheel brakes 10, 11 is realized through the valves 101', 102', 101", and 102". At the rear axle HA, the pedal 1 is at first positioned in the direction of pressure increase by energization of the hydraulic valve 34 and then the pressure at the rear axle HA modulated by alternately energizing the valves 101''', 108.

If and when after fully exploiting the pedal travel, the control current which activates the valves should fail upon a pressure decreasing phase, then the first brake circuit I''' must have a residual braking efficiency. For this purpose, the volume and the actuating travel of the master cylinder 2 are dimensioned such that the maximum brake pressure comes about at a sufficient distance before the end position of the piston is reached. The actuating travel of the master cylinder 2 associated with this is sensed by the pedal travel transmitter 5, and at this point, the pedal 1 will then be positioned in the direction of pressure increase, independently of the braking mode (service braking or anti-lock control action), by energization of the hydraulic valve 34. In this manner, the residual volume of the master cylinder 2 will always fully be preserved for the emergency case of an anti-locking control action.

Figure 7:
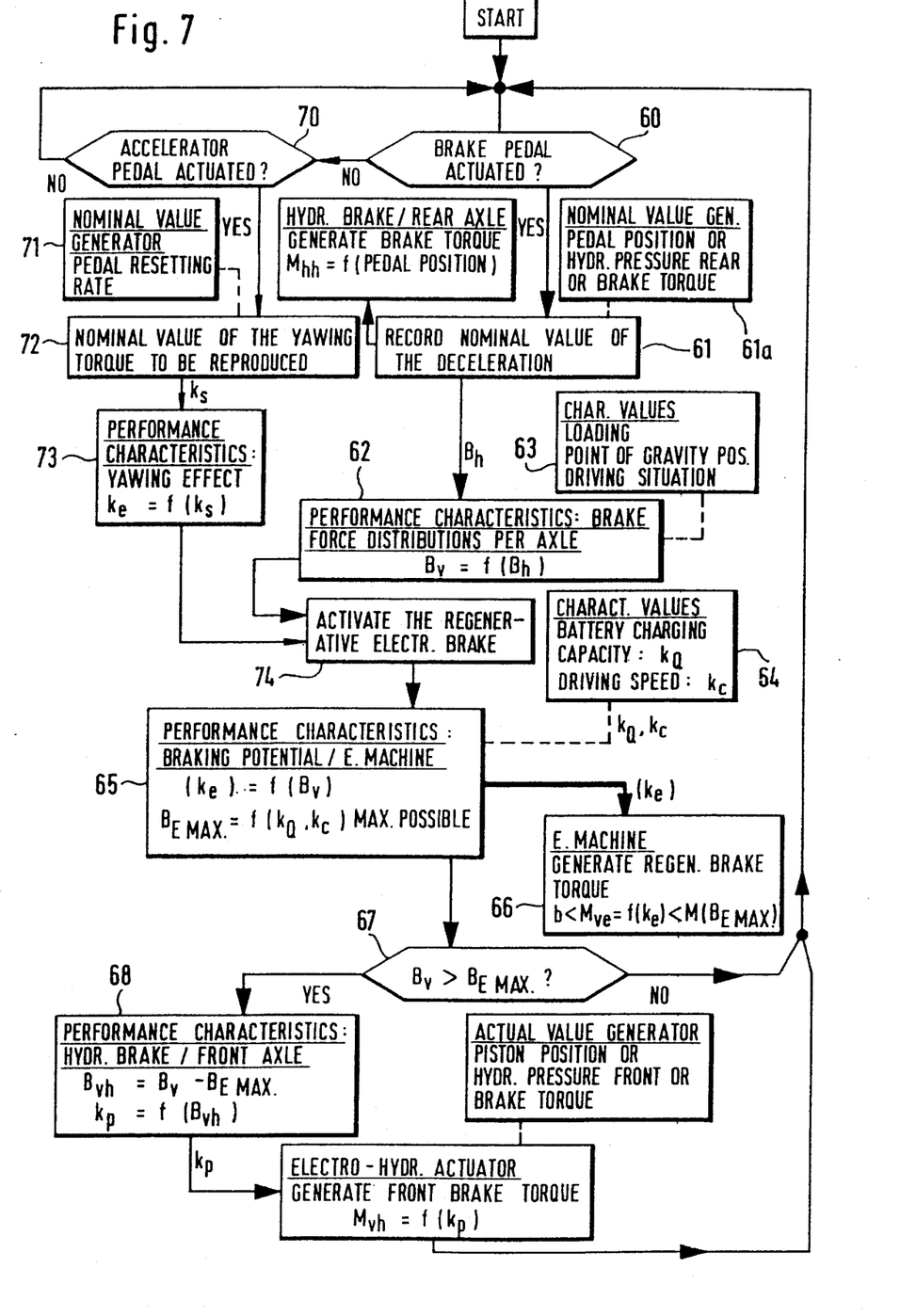
FIG. 7 shows the block diagram of a braking action with the aid of the brake unit in FIG. 1.

The sequence diagram in FIG. 7 serves as an illustration of the operations in the event of an actuation of the inventive brake unit, including the compound system. First of all, the operations upon the actuation of the brake pedal, symbolized by the branching symbol 60, will be ascertained. The brake pedal has, of course, precedence over the accelerator pedal. By an actuation of the brake pedal 1 (shown in FIGS. 1 to 6), a brake torque will directly be generated hydraulically at the wheels of the rear axle HA and simultaneously a measure for the nominal value of the deceleration (61) will be gained. The nominal value generators (61a) used for this purpose can be a pedal position transmitter 5, a brake pressure sensor 24 in the rear axle circuit or a torque transmitter 22 at the rear axle. With this nominal value $B_h$ which constitutes simultaneously a measure of the nominal value of the brake power portion of the rear axle, a brake power portion $B_v$ for the front axle depending on the momentary conditions is correlated through stored performance characteristics (62). In this conjunction, the selection of the valid performance characteristics will expediently be controlled by a linkage of external parameters, for example, loading, position of the center of gravity, driving situation, etc. (63). Instead of the methods of operation with performance characteristics as described, other algorithms can, of course, be used as well.

With the aid of characteristic values regarding the momentary driving speed ($k_c$) and the momentary absorption capacity of the battery, the make-up charging capacity of the battery $k_Q$ (symbolized by the characteristic values 64), the maximum useful brake power portion $B_{Emax}$ of the driving motor 12 is determined in the stage 65 through stored performance characteristics. Then, block 67 determines whether or not the demanded front axle brake power $B_v$ value exceeds the value $B_{Emax}$ (66).

If and when it is determined in the branching block 67 that the demanded value $B_v$ is lower than the value $B_{Emax}$ or, at most, equals it, then the brake power of the driving motor 12 alone will act upon the wheels of the front axle VA. In the embodiment described here, starting from this value $B_v$ in the range of zero to $B_{Emax}$, a control parameter set $k_e$ will be formed for the driving motor 12 or determined from a table, and the electroregenerative braking action of the wheels at the front axle VA will be initiated. If and when the demanded brake power portion $B_v$ exceeds the momentarily value $B_{Emax}$, then in the stage 68 on the basis of further performance characteristics a control parameter $k_p$ is determined from the difference $B_{vh}=B_v-B_{Emax}$. This control parameter will serve as a nominal value for the electric actuator (8 in FIG. 1) of the hydraulic front axle brake circuit (III) in order to contribute, in a controlled manner, the residual brake torque at the front wheels.

The described operations are cyclically repeated and take place so rapidly that the build-up of brake power at the front axle follows the build-up of brake power at the rear axle without any sensible delay.

For the duration of an anti-lock control or traction slip control action, as has been described making reference to the embodiments according to FIGS. 3, 4, and 5, the electroregenerative brake system II', II" will be prevented from functioning with the aid of the locking switching loop 54 which acts upon the electronic motor control unit 13, 13".

For the reproduction of the yawing torque, the movement of the accelerator pedal will be monitored, as is denoted by the symbols 70, 71, 72, 73, every time the brake pedal 1 is not operated. When the accelerator pedal 17 moves back, a parameter $k_s$ (72) will be derived from the resetting rate, then a control parameter set $k_e$ (73) for the driving motor 12 will be determined from yawing torque characteristics, and the electroregenerative brake system (II, II') will be activated (74). The further control sequence corresponds to that which has been described before. It is possible to set off the share of the yawing torque effect against that of the brake pedal effect in such a manner that both effects will supplement each other and will be absorbed in each other.

We claim:

1. A brake unit for automotive vehicles with electric drive, with a driven and a non-driven axle of vehicle wheels, with a first set of hydraulic friction brakes individually associated with said vehicle wheels of said driven axle, and with a second set of hydraulic friction brakes individually associated with said vehicle wheels of said non-driven axle, wherein said brake unit is provided in the shape of a multiple-circuit compound system consisting of said first set and said second set of said hydraulic friction brakes and an electroregenerative brake system, said electroregenerative brake system utilizing an electric driving motor of the automotive vehicle for braking and for energy recovery, and three brake circuits being provided, a first brake circuit which is comprised of a pedal-actuated brake pressure master unit and of said second set of hydraulic friction brakes, a second brake circuit which is constituted by the electroregenerative brake system which is directly or indirectly coupled to a brake pedal and which acts upon said driven wheels, and a third brake circuit which is comprised of said first set of hydraulic friction brakes and is coupled to the brake pedal, wherein an electronic controller which is fed with information on brake pressure caused by actuation of the brake pedal, on vehicle speed and on the charging condition of the vehicle batteries and evaluates said information for controlling said second brake circuit and said third brake circuit and for controlling the distribution of the brake power to said driven and said non-driven axles, characterized in that said first set of hydraulic friction brakes in a way isolated hydraulically from the brake pressure master unit, are connected to at least one of:

(a) an electrohydraulic actuating mechanism which is driven by actuating signals of the controller, and (b) an auxiliary pressure source, for braking said vehicle wheels of said driven axle by applying pressure fluid to said first set of hydraulic friction brakes.

2. A brake unit as claimed in claim 1 wherein the friction brakes through electrically actuatable hydraulic valves are connectable to said auxiliary pressure source, which comprises a pressure balancing tank, the said auxiliary pressure source being drivable by actuating signals of the controller and being composed of an electromotively driven hydraulic pump and a hydraulic accumulator.

3. A brake unit as claimed in claim 2, characterized in that the electronic controller varies the brake power distribution depending on the loading of the vehicle and/or on the distribution of the dynamic axle load and/or on the driving situation.

4. A brake unit as claimed in claim 1 characterized in that the first and the third hydraulic brake circuits are extended to form an anti-lock control system and/or a traction slip control system by inserting hydraulic valves which are controllable depending on the rotational behavior of the individual wheels by way of a Multiplex circuit.

5. A brake unit as claimed in claim 4, characterized in that the third brake circuit is subdivided in such a way that the friction brakes acting upon the driven wheels can be actuated independently of each other.

6. A brake unit as claimed in claim 5, characterized in that the wheel brakes acting upon the driven wheels are connectible, through electrically actuatable hydraulic valves on one hand to hydraulic accumulators and, on the other hand, to said auxiliary pressure source being comprised of a pressure balancing tank, a further hydraulic accumulator being additionally connected to the auxiliary pressure source and being connectible, through further electrically actuatable hydraulic valves, both to the friction brakes which act upon the non-driven wheels and to the friction brakes which act upon the driven wheels.

7. A brake unit as claimed in claim 4, characterized in that the electroregenerative brake system can be switched off for the duration of an anti-lock control and/or a traction slip control action.

8. A brake unit as claimed in anyone of claim 4 in that through a totalizing stage the pedal force and an actuating power being generated with the aid of an actuator act upon the brake pressure master unit.

9. A brake unit as claimed in claim 8, characterized in that a pedal travel limiter, respectively an actuator, is provided for the limitation of the pedal force in the case of an anti-lock control action.

10. A brake system for automotive vehicles with electric drive, an accelerator pedal, a vehicle battery having a charging condition and a driven axle and a non-driven axle of vehicle wheels, said brake system comprising:

a brake pedal;

a first set of hydraulic friction brakes individually associated with said vehicle wheels of said driven axle;

a second set of hydraulic friction brakes individually associated with said vehicle wheels of said non-driven axle;

a multiple-circuit compound brake system including:

(a) a first brake circuit having a pedal-actuated brake pressure master unit for braking said vehicle wheels of said non-driven axle by applying pressure fluid to said second set of hydraulic friction brakes, (b) a second brake circuit which is an electroregenerative brake circuit, responsive to movement of said brake pedal, having an electric driving motor, for braking said vehicle wheels of said driven axle and for recovering energy from said vehicle wheels of said driven axle, (c) a third brake circuit, responsive to movement of said brake pedal and hydraulically isolated from said pedal-actuated brake pressure master unit, including at least one of:

(i) an electrohydraulic actuating mechanism, and (ii) an auxiliary pressure source, for braking said vehicle wheels of said driven axle by applying pressure fluid to said first set of hydraulic friction brakes;

means for developing vehicle speed signals representative of the vehicle speed;

means for developing charging condition signals representative of the charging condition of the vehicle battery;

means for developing pressure signals representative of the pressure in said pedal-actuated brake pressure master unit; and an electronic controller, responsive to:

(a) said vehicle speed signals, (b) said charging condition signals, (c) said pressure signals, for generating control signals for controlling braking operation of said electroregenerative brake circuit and said third brake circuit.

11. A brake system in accordance with claim 10, wherein said third brake circuit includes said electrohydraulic actuating mechanism, which responds to said control signals.

12. A brake system in accordance with claim 10, wherein said third brake circuit includes said electrohydraulic actuating mechanism which comprises:

an electrically controllable actuator responsive to said control signals; and a master cylinder responsive to said electrically controllable actuator; and said brake system further comprises:

means for developing accelerator pedal position signals representative of the position of said accelerator pedal;

means for developing master cylinder pressure signals representative of the pressure of said master cylinder;

means for developing brake pedal position signals representative of the position of said brake pedal; and wherein said electronic controller further responds to said accelerator pedal position signals, said master cylinder pressure signals and said brake pedal position signals.

13. A brake system in accordance with claim 10, wherein said third brake circuit includes said auxiliary pressure source and further comprises:

a first electrically actuatable hydraulic valve disposed between said first set of hydraulic friction brakes and said auxiliary pressure source;

a pressure balancing tank; and a second electrically actuatable hydraulic valve disposed between said first set of hydraulic friction brakes and said pressure balancing tank.

14. A brake system in accordance with claim 13, wherein said auxiliary pressure source comprises a hydraulic accumulator and an electromotively driven hydraulic pump, which responds to said control signals of said electronic controller.

15. A brake system in accordance with claim 10, further comprising:

means for developing loading signals representative of vehicle loading;

means for developing driving situation signals representative of the driving situation;

means for developing distribution signals representative of the distribution of the axle load; and wherein said electronic controller further responds to said loading signals, said driving situation signals and said distribution signals for developing said control signals and for distributing brake power to said driven axle and said non-driven axle.

16. A brake system in accordance with claim 10 further comprising a circuit for generating rotational behavior signals representative of the rotational behavior of the vehicle wheels and wherein:

said electronic controller responds to said rotational behavior signals; and said first and said third hydraulic brake circuits each comprise hydraulic valves, which are controllable depending on the rotational behavior of said vehicle wheels, to form at least one of an anti-lock control system or a traction slip control system.

17. A brake system in accordance with claim 10, wherein said third brake circuit is subdivided for independently actuating a first of said hydraulic friction brakes of said first set of hydraulic friction brakes from a second of said hydraulic friction brakes of said first set of said hydraulic friction brakes.

18. A brake system in accordance with claim 17, wherein said first set of said hydraulic friction brakes includes a first driven hydraulic friction brake and a second driven hydraulic friction brake and wherein said third brake circuit includes said auxiliary pressure source including a pressure balancing tank and third brake circuit further comprises:

a first and a second hydraulic accumulator individually associated with said first and second driven hydraulic friction brakes;

a first electrically actuatable hydraulic valve disposed between said first hydraulic accumulator and said first driven hydraulic friction brake;

a second electrically actuatable hydraulic valve disposed between said second hydraulic accumulator and said second driven hydraulic friction brake;

a third electrically actuatable hydraulic valve disposed between said first driven hydraulic friction brake and said auxiliary pressure source;

a fourth electrically actuatable hydraulic valve disposed between said second driven hydraulic friction brake and said auxiliary pressure source;

a fifth electrically actuatable hydraulic valve disposed between said auxiliary pressure source and said third and fourth electrically actuatable hydraulic valves;

and said brake system further comprises sixth and seventh electrically actuatable hydraulic valves disposed between said second set of hydraulic friction brakes and a point between said third, fourth and fifth electrically actuatable hydraulic valves.

19. A brake system in accordance with claim 10 further comprising means, responsive to said electronic controller, for switching off said electroregenerative brake circuit during an anti-lock control and a traction slip control action.

20. A brake system in accordance with claim 10, wherein said first brake circuit further comprises:

an actuator, responsive to said control signals, for developing totalizing stage control signals; and a totalizing stage, responsive to said totalizing stage control signals and movement of said brake pedal, for transmitting brake pedal force to said pedal-actuated brake pressure master unit and for serving as an anti-lock control and traction slip control unit.

21. A brake system in accordance with claim 20, wherein said first brake circuit further comprises a pedal travel limiter, disposed between said brake pedal and said pedal-actuated brake pressure master unit, for limiting the transmission of pedal force during an anti-lock control action.

22. A brake system in accordance with claim 21, wherein said pedal travel limiter is a pedal stop actuator.

23. A brake system in accordance with claim 10 further comprising:

means for developing accelerator pedal position signals representative of the position of said accelerator pedal;

means for developing brake pressure signals representative of the brake pressure of said hydraulic friction brakes;

means for developing brake pedal position signals representative of the position of said brake pedal; and wherein said electronic controller further responds to said accelerator pedal position signals, said brake pressure signals and said brake pedal position signals.

* * * * *